Figure 1:
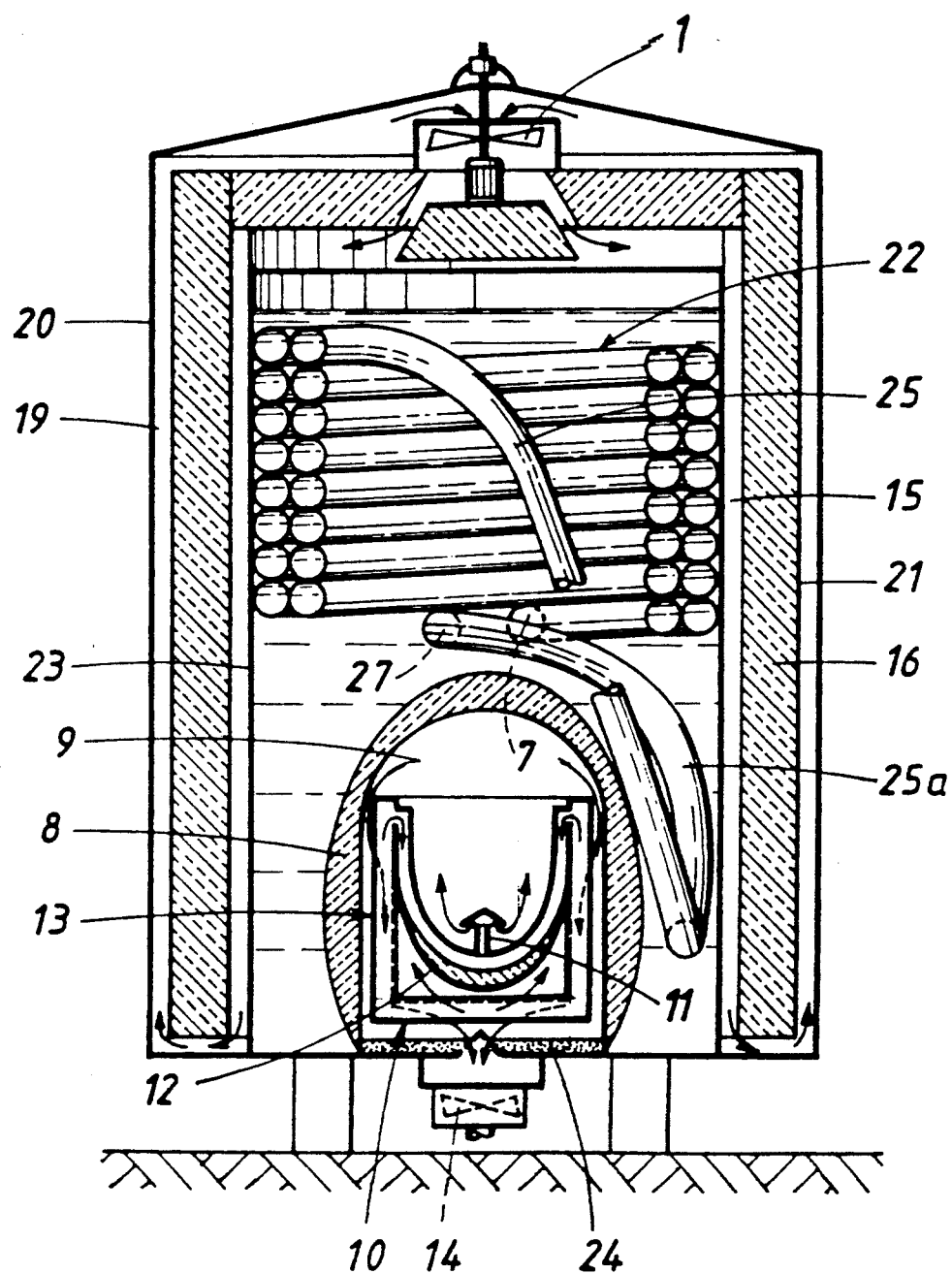

United States Patent [19]

Freller

[11] Patent Number: 5,315,938
[45] Date of Patent: May 31, 1994

[54] HEAT ACCUMULATOR

[76] Inventor: Walter Freller, Innerschwant 226, A-5310 Mondsee, Austria

[21] Appl. No.: 969,114

[22] Filed: Oct. 30, 1992

Related U.S. Application Data

[63] Continuation of Ser. No. 425,187 filed as PCT/AT88/00014, Mar. 23, 1988, abandoned.

[30] Foreign Application Priority Data

Mar. 24, 1987 [AT] Austria .................................. 694/87

[51] Int. Cl.⁵ .............................................. F23B 7/00
[52] U.S. Cl. ...................................... 110/233; 110/229; 110/234; 122/33; 122/35
[58] Field of Search ................... 122/17, 33, 31.1, 31.2, 122/35; 110/234, 229, 233

[56] References Cited

U.S. PATENT DOCUMENTS

| | | | |
|---|---|---|---|
| 3,237,608 | 3/1966 | Brandl | 122/33 |
| 4,226,195 | 10/1980 | Lindrous | 122/33 X |
| 4,329,943 | 5/1982 | Schwörer | 122/17 |
| 4,582,121 | 4/1986 | Casey | 122/33 X |

*Primary Examiner*—Edward G. Favors
*Attorney, Agent, or Firm*—Collard & Roe

[57] ABSTRACT

Liquid accumulators which substantially include several or at least one type of energy generation, such as heatable to almost the temperature of fresh air by solar irradiation with the thermal supply of circulation heat, by refuse combustion with the recovery of waste heat, by recovery of waste heat from exhaust gases in the case of heating boilers and generators, and also usable in a continuous process for the production of biogas from small refuse in the sewage.

6 Claims, 3 Drawing Sheets

HEAT ACCUMULATOR

This is a continuation of my U.S. patent application Ser. No. 07/425,187, filed as PCT/AT88/00014, Mar. 23, 1988, abandoned.

Heat accumulators are insulated containers holding a liquid heat transfer medium which store heat introduced into the liquid medium by a heating system. In the case of water boilers, one always seeks to immediately dissipate the heat into the liquid medium. Therefore, they must be operated with a high flue gas temperature, as otherwise the combustion will be extinguished. In this process, a lot of heat gets lost through the smoke stacks with the escaping flue gases. A subsequent flue gas cooling only provides for a decrease of the flue gas temperature to hot water temperature, but it is not possible to cool exhaust gases to ambient air temperature.

In the case of biogas plants, one tries to bring the fermentable material into fermentation vessels and to evacuate the same from time to time. This process includes the problems that the solid constituents precipitate again and again and, unless they are removed mechanically, fill the fermentation vessel and thus considerably restrict the production of biogas. It is an absolute necessity to constantly undertake this maintenance effort.

According to the present invention, liquid containers, which constitute heat accumulators, are so designed that they can absorb heat from the environment and also solar energy, provide for a refuse combustion with the recovery of waste heat, and can also be used for the recovery of heat from heated gases supplied from conventional heating systems or heat generating engines, which can be disposed outside or inside the heat accumulator.

By means of an installed system for the generation of biogas it is possible to continuously produce biogas from sewage and to store said biogas. In the case of refuse combustion, it is an object of this invention to decrease the waste gas temperature to the temperature of the ambient air, in order to bind the toxic substances in the flue gas with the resulting condensate, and to avoid polluting the environment.

Moreover, the waste heat is utilized and recovered repeatedly and insulated from the liquid medium, so that the combustion temperature constantly increases and accelerates and improves the combustion. In essence, all indicated types of heat generation could be included, but at least one type of heat generation is provided, such as solar radiation, refuse combustion, recovery of waste heat from the waste gases of boilers and generators. The heat accumulator is also usable for the production of biogas from refuse in the sewage flowing through an ascending pipe, and comprises a combustion chamber and a counter-flow heat exchanger extending vertically disposed downwardly and transverse to the combustion chamber, for cooling the combustion gases or the waste heat exhausted from the combustion chamber by an exhaust ventilator approximately to the inlet air temperature, thereby considerably heating the inlet air for the combustion in the combustion chamber by means of the counter-flow heat exchanger. Insulation against the heat in the combustion chamber is provided by an insulation pad insulating the heat accumulator from the combustion chamber. The accumulator is insulated from the outside by an insulation spaced by spacers from the accumulator wall to form a gap. In the case of solar irradiation air or gaseous media is circulated through the gap when the air circulation is switched on through a regulating device for a ventilator, and the solar heat is supplied to the spacers and the heat accumulator. The accumulator has a charging basket movable in and out of the combustion chamber, which can also be tilted and swivelled for discharging the ashes, and which comprises the counter-flow heat exchanger and an insulated deflection baffle. The heated inlet air is distributed in the direction toward the counter-flow heat exchanger through inlet openings in the charging basket, and oxygen and heat are supplied for the combustion, the heated exhaust gases are sucked off from the combustion chamber through a ventilator past the outer surfaces of the counter-flow heat exchanger, where the resulting condensate and the circulating solid constituents of the exhaust gases are trapped in a sand filter and the cooled exhaust gases are passed to the open air through a ventilator. A hose or pipe coil is arranged in the upper portion of the heat accumulator and serves the generation of biogas from fermentable material flowing through the coil. The coil ascends spirally in the heat accumulator, and before discharging the fermentable material from the pipe through a discharge line extends downwardly in the heat accumulator in a loop for the recovery of the waste heat of the fermentable material, while a biogas discharge line is provided at the uppermost spiral of the coil. In the case of a pressureless operation of the medium accumulator, pressure compensation and degassing of the heat accumulator are effected through a vent hole.

Figure 2:
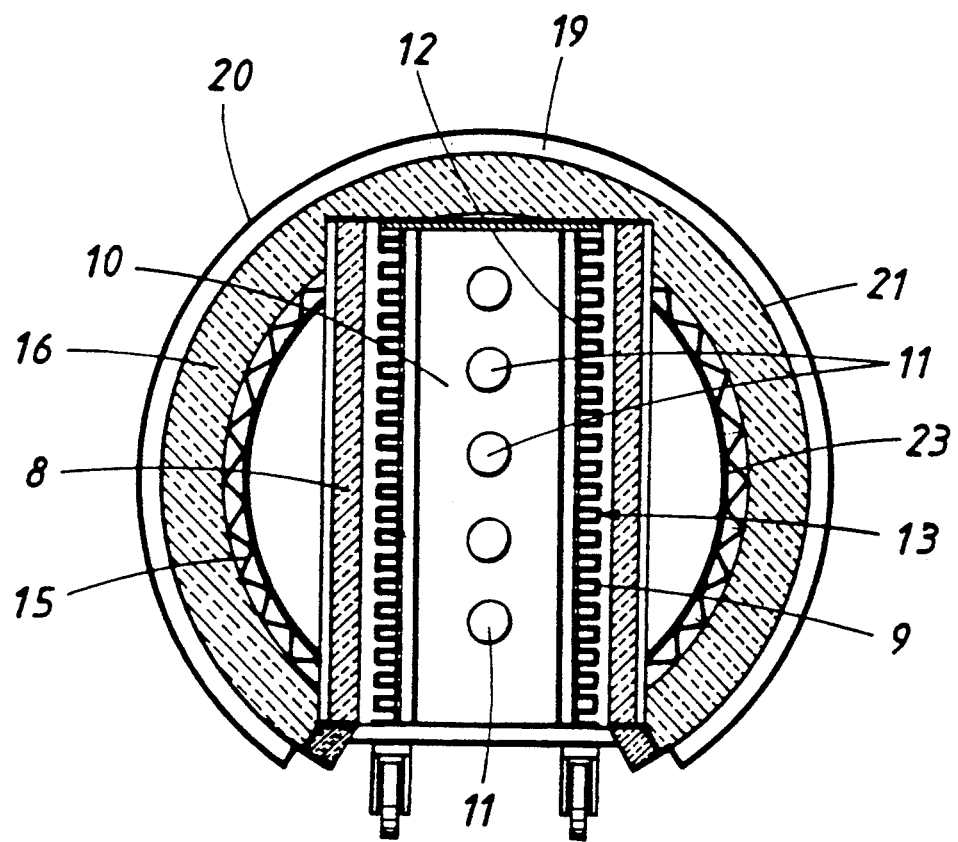
Figure 3:
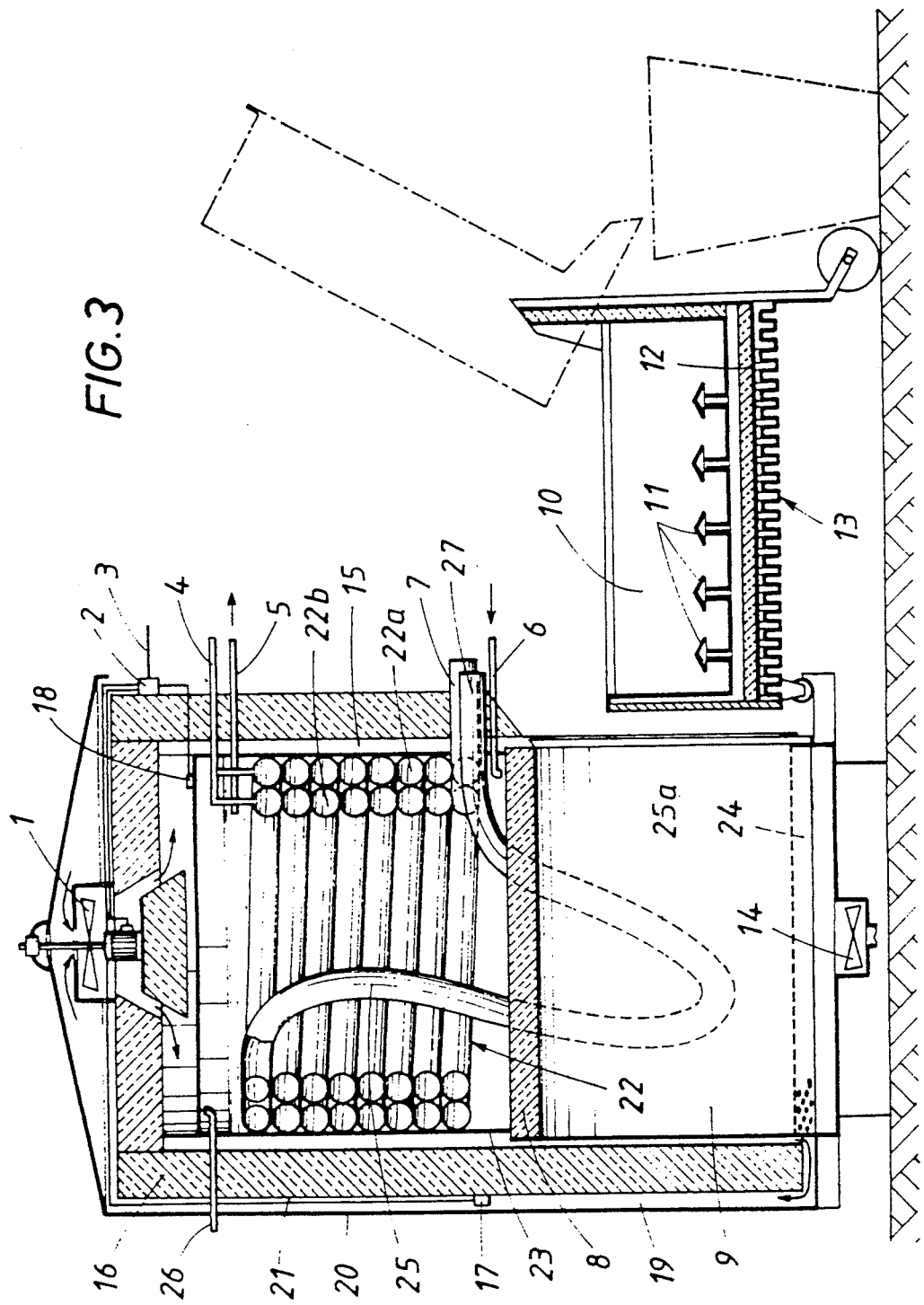

In the drawing, FIG. 1, FIG. 2, and FIG. 3 illustrate preferred embodiments of a heat accumulator according to the invention, by way of example.

FIG. 1 shows a longitudinal section through the heat accumulator 23. A transparent casing 20 surrounds the wall of the container holding a liquid heat transfer medium and is spaced from the wall thereof to form a gap therebetween, and the container is insulated by insulation 16 disposed in the gap and provided with the heat-absorbing surface 21, which forms gap 19 with casing 20. In the upper portion, the insulation 16 has an intake opening through which a ventilator circulates air, as shown by arrows indicating the air flow. Spacers 15 (see FIG. 2) provide the clearance for the air circulation between the heat accumulator and the insulation 16. The hose or pipe coil 22, which serves the biogas generation, extends upwardly in the heat accumulator 23 and the biomass is guided to the outside of the heat accumulator 23 in a loop 25. The combustion chamber 9 inside the accumulator comprises burner 11 and is surrounded by an insulation pad 8 to insulate the combustion chamber. Counter-flow heat exchanger 13 extends vertically downwardly and transverse to the combustion chamber 9 and comprises an insulated deflection baffle 12 around the combustion chamber. The combustion chamber and the counter-flow heat exchanger are contained in a tiltable charging basket 10, which can be moved in and out of the heat accumulator, and sand filter 24 is disposed below changing basket 10, from which the exhaust air is sucked off through a ventilator 14.

FIG. 2 shows the cross-section of the heat accumulator 23 in the vicinity of the combustion chamber 9. The transparent casing 20 encloses the insulation 16, the spacers 15 and the heat accumulator 23, the insulation pad 8, the combustion chamber 9, the counter-flow heat exchanger 13 and the charging basket 10.

FIG. 3 shows a longitudinal section through a heat accumulator, the charging basket 10 with the counter-flow heat exchanger 13 being moved out of the accumulator for cleaning and charging. On the front side, it has fresh water connections 5 and 6 for circulating the heat transfer medium through the heat accumulator container, and the supply and discharge line of sewage connections 7, and biogas discharge line 4, all connected to coil 22, power supply 3, heat regulating device 2 with the two thermosensors 17 and 18. A vent hole 26 serves for pressure compensation and desulphurization or degassing of fresh water.

As shown in the drawing, the hose or pipe coil 22 for generating the biogas is comprised of two parallel coil branches 22a, 22b, and the lower end of the coil is connected to common inlet 7 which extends radially with respect to the container and the coil branches. The upper end of the coil is connected to common coil section 25 looping downwards within the concentric coil branches 22a, 22b and forming loop 25a at the bottom of the container, the upper end of the loop being connected to outlet 27. The two uppermost coils of branches 22a, 22b are connected to common biogas discharge line 4. The biogas generation operates in the following manner:

The fluid biomass to be fermented is pumped through inlet 7 to coil 22 and passes through concentric coil branches 22a, 22b until it rises to the uppermost coils of the branches into coil section 25 and fill loop 25a with the biomass. At this point, the feeding of the fluid biomass is discontinued. The heat generated by the liquid heat transfer medium in the container will cause fermentation of the biomass, and the resultant biogas will be collected in the upper coils of coil branches 22a, 22b. The remaining fluid biomass in the lower parts of coil 22 and coil section 25 will prevent any escape of biogas downwardly since the freely hanging loop 25a functions as a siphon.

The biogas collected in the uppermost coils and displacing the liquid biomass downwardly remains under the pressure of the liquid biomass and may be discharged through line 4 at will. If desired, line 4 may be connected to a biogas user and a suitable valve in the line may control the discharge of the biogas from line 4. When the amount of discharged biogas reaches a predetermined extent, additional liquid biomass is pumped through inlet 7 while a portion of the fermented biomass is removed from coil section 25 and loop 25a through outlet 26. In this way, a substantially continuous production of biogas can be assured by suitably adjusting the amount of biomass fed to coil 22 in dependence on the fermentation speed.

What is claimed is:
1. A heat accumulator comprising
  (a) a container for a liquid heat transfer medium,
  (b) heat insulation surrounding the container and heat-insulating the container from the ambient atmosphere,
  (c) a combustion chamber in the container, the chamber receiving combustion air,
  (d) an exhaust ventilator arranged to exhaust gases from the combustion chamber,
  (e) a counter-flow heat exchanger surrounding the combustion chamber, the exhaust ventilator being arranged to cause the exhaust gases to flow therethrough for pre-heating the combustion air in the combustion chamber, and
  (f) a heat-insulating pad surrounding the combustion chamber for heat-insulating the liquid heat transfer medium from the combustion chamber.

2. The heat accumulator of claim 1, further comprising a tubular coil mounted in the container and comprised of a plurality of superposed windings including a lowermost and an uppermost winding, an inlet for a liquid biomass connected to the lowermost coil winding for supplying the biomass to the coil, and a downwardly extending outlet for the biomass and a biogas discharge line connected to the uppermost coil winding.

3. The heat accumulator of claim 2, wherein the downwardly extending biomass outlet comprises a tubular loop hanging in the container.

4. The heat accumulator of claim 1, further comprising a casing surrounding the heat insulation and capable of transmitting solar energy impinging thereon, the casing defining a flow channel with the heat insulation and the heat insulation defining another flow channel with the container, the flow channels being in communication with each other to form a closed circulation path for a gaseous heat transfer medium, and a ventilator arranged in the circulation path for circulating the gaseous heat transfer medium through the flow channels.

5. The heat accumulator of claim 1, further comprising a charging basket having side walls defining the combustion chamber and being retractible into, and movable out of, the container, the counter-flow heat exchanger constituting the side walls of the charging basket and extending transverse to the combustion chamber below the bottom thereof.

6. The heat accumulator of claim 1, further comprising a sand filter arranged in the container below the combustion chamber and ahead of the exhaust ventilator whereby the exhaust gases are passed through the sand filter.

* * * * *